Patented Nov. 28, 1950

2,531,602

UNITED STATES PATENT OFFICE 2,531,602

PRODUCTION OF THIOETHERS AND/OR MERCAPTANS

Richmond T. Bell, Highland Park, Ill., assignor to The Pure Oil Company, Chicago, Ill., a corporation of Ohio No Drawing. Application December 28, 1946, Serial No. 719,137

6 Claims. (Cl. 260—609)

This invention relates to a method of reacting unsaturated organic compounds in controlled manner with sulfhydryl compounds such as hydrogen sulfide and mercaptans to produce addition products of predetermined type. More specifically, the invention relates to a method of effecting the synthesis of mercaptans and thioethers from unsaturated hydrocarbons to produce secondary or tertiary mercaptans, and symmetrical or unsymmetrical secondary or tertiary thioethers.

As is well known in organic chemistry, Markownikoff's empirical rule defining the mode of addition of HX to unsaturated compounds states that when the reagent being added to an unsaturated bond enters the compound as H and X, the X becomes attached to that carbon atom of the unsaturated linkage which holds the fewer hydrogen atoms. When the rule is applied to the addition of compounds of the general formula RSH to unsaturated compounds, where R may be hydrogen or an organic radical, it indicates that —SR will become attached to the unsaturated carbon atom having the lesser number of hydrogen atoms. It has been observed that when peroxides, air, free oxygen, ozone, etc. are present in a reaction system containing an unsaturated compound and HR, the addition takes place in direct opposition to the rule; that is, with RSH the —SR portion of the molecule will be attached to the unsaturated carbon atoms having the greater number of hydrogen atoms. Because unsaturated hydrocarbons usually contain peroxides created by incipient atmospheric oxidation, it is apparent that the synthesis of secondary or tertiary mercaptans or thioethers from unsaturated hydrocarbons is complicated by the fact that the addition of a mercaptan or hydrogen sulfide will not take place normally, i. e., according to Markownikoff's rule, unless the hydrocarbon is freed of peroxides.

Accordingly, it is an object of this invention to provide a method of synthesizing mercaptans and thioethers from unsaturated hydrocarbons wherein the orienting effect of peroxides occurring in the unsaturated hydrocarbon is neutralized.

A second object of the invention is to provide a method of synthesizing secondary or tertiary mercaptans from hydrogen sulfide and unsaturated hydrocarbons having non-terminal or terminal unsaturations, without the necessity of preliminary removal of peroxide occurring in the hydrocarbon.

A further object of the invention is to provide a method of preparing symmetrical or unsymmetrical thioethers having secondary or tertiary carbon-sulfur linkages from mercaptans and unsaturated hydrocarbons having terminal or non-terminal unsaturations, without the necessity of preliminary removal of peroxides from the unsaturated hydrocarbon used.

Other objects and advantages of the invention will in part be obvious, and in part appear hereinafter.

Briefly, I have discovered that a process for making mercaptans and thioethers from unsaturated hydrocarbons and sulfhydryl compounds corresponding to the formula RSH, wherein R may be any hydrocarbon radical or hydrogen, can be carried out in the presence of peroxides in a manner such that the orienting influence of the peroxides can be neutralized to permit the addition of RSH to the unsaturated compound to take place in accordance with Markownikoff's rule by conducting the reaction between the hydrocarbon and the sulfhydryl compound under anhydrous conditions and mild temperatures and in the presence of an anhydrous Friedel-Crafts type of catalyst. I have found that under such conditions the RS— portion of the sulfhydryl compound is attached to the unsaturated carbon atom having the smaller number of hydrogen atoms, i. e., the addition takes place in accordance with Markownikoff's rule, and the orienting influence of such peroxides as may be present is nullified.

Since unsaturated hydrocarbons are prone to develop peroxides very quickly from exposure to the atmosphere, one of the primary advantages of the invention arises from the fact that no preliminary purification of the unsaturated hydrocarbon is necessary in order to have the addition take place to create the tertiary and secondary mercaptans and thioethers desired. Because removal of peroxides from unsaturated hydrocarbons is a difficult and expensive step when carried out preliminary to synthesis of mercaptans, and also because the ease with which peroxides are formed creates the necessity of using immediately any freshly purified unsaturated hydrocarbons, it is apparent that the invention effects notable economies in the synthesis of mercaptans and thioethers by the addition of RSH to unsaturated hydrocarbons.

The reaction between the unsaturated hydrocarbon and the sulfhydryl compound is conducted under anhydrous conditions in the presence of an anhydrous Friedel-Crafts type catalyst, which can be essentially any of the metal halides or metal halide complexes which have been used in the art for such purposes. For example, aluminum chloride, aluminum bromide, boron trifluoride, boron trifluoride etherate, zirconium tetrachloride, ferric chloride, beryllium chloride, gallium chloride, boron fluoride mixtures with hydrogen fluoride, and, in general, mixtures of any of the active halides with corresponding halogen acid, when supported on carriers or when used alone, or when used as flux with other halide salts, or complexes of the active, anhydrous halides, such as those with unsaturated hydrocarbons, ethers, thioethers, alcohols, thioalcohols, hydrogen sulfide, organic halogen compounds, etc. may be used as the catalyst. When used in anhydrous form and in the manner described in the following examples, the catalyst not only nullifies the orienting effect of any peroxides present, but also produces high yields at comparatively low temperatures and pressures, and short contact times.

The conditions under which the reaction is carried out, such as temperature, pressure, contact time, mole ratio of reactants to each other and to catalyst, and mole of operation, may be varied widely to suit best the characteristics and activity of reactants and catalysts for each other in relation to the particular product it is desired to obtain. For example, it has been found that the reaction can be successfully carried out over as wide a temperature range as from −35° C. to 125° C. It is apparent that with such latitude, an optimum temperature of operation can be easily selected for each specific combination of reactants. Similarly, optimum pressure conditions can be determined for specific combinations of reactants and catalysts in relation to the product desired.

The unsaturated organic compounds which may be reacted with hydrogen sulfide and mercaptans according to the invention include those which contain one or more unsaturations, olefinic, acetylenic, or both, between two aliphatic carbon atoms, regardless of the class or character of the compound containing such linkage. The class of compounds contemplated by the instant process includes unsaturated hydrocarbons and substitution products thereof as illustrated by the following: alkenes, alkyldienes, alkylpolyenes, alkynes, unsaturated alicyclic hydrocarbons, etc., and derivatives of the foregoing classes of hydrocarbons which contain substituent groups substantially inert under the conditions of the invention. For example, inert atoms or groups such as halogen may be present as well as hydrocarbon substituents such as aromatic or cycloaliphatic groups. Examples of hydrocarbons which may be employed are ethene, propene, butenes, pentenes, hexenes, cyclohexene, 1-methylcyclohexene-1; di-isobutylenes such as 2,4,4-trimethylpentene-1 and 2,4,4-trimethylpentene-2, octene-1 and -2; tri-isobutylenes such as 2,2,4,6,6-pentamethylheptene-3, 2-neopentyl-4,4-dimethylpentene-1, and 2,4,4,6,6-pentamethylheptene-2 and -1, 1,4-diphenylbutene-2, dodecene-1 and -2, cetene-1 and -2; tetraisobutylenes; butadiene-1,3, pentadiene-1,3 and -1,4, hexadiene-1,4 and -1,5, ethyne, propyne, butyne-1 and -2, pentyne-1 and -2, octyne-1, dodecyne-1, cetyne-1, hexadiyne-2,4, diamylethyne, phenylethyne, butadiyne, etc., and their homologues and analogues.

Heretofore, according to teachings in the prior art, in order to prepare secondary mercaptans from olefins in the presence of peroxides, it has been necessary to use olefins having the double bond in a non-terminal position as starting materials. Tertiary mercaptans could not be prepared, even with the double bond in a non-terminal position, except from a comparatively uncommon type of "tertiary-base" olefin in which each of the two carbon atoms of the double bond holds two hydrocarbon radicals.

"Tertiary-base" olefins are defined as those olefins included by the general formula

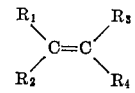

where both radicals attached to one carbon atom of the double bond are hydrocarbon radicals such as alkyl, alicyclic, aromatic, alkenyl, and alkynyl, and the radicals attached to the other carbon atom of the double bond are either (1) both hydrogen, (2) one hydrogen and one hydrocarbon radical, or (3) both hydrocarbon radicals. It is seen that sub-class (1) can exist only when the double bond is terminal. Di-tertiary-base olefins, sub-class (3), as well as sub-class (2) can exist only when the double bond is non-terminal. Typical hydrocarbons illustrating the three types of compounds are the following:

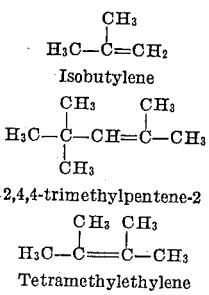

Similarly, heretofore in order to prepare secondary thioethers from olefins and mercaptans, apart from the carbon to sulfur linkage present in the mercaptan used, which may be a primary, secondary, or tertiary linkage, an olefin having the double bond in a non-terminal position was necessary. A tertiary thioether could not be prepared, even from tertiary-base olefins, with the sole exception of sub-class (3) olefins.

In accordance with this invention, secondary mercaptans can be produced from non-tertiary-base olefins having either a terminal or non-terminal double bond, and tertiary mercaptans can be produced from any tertiary-base olefin regardless of the position of the double bond and the presence of peroxides in the starting material. Similarly, this invention provides a method for producing from non-tertiary-base olefins and mercaptans symmetrical or unsymmetrical thioethers containing a secondary carbon to sulfur linkage. In addition, symmetrical or unsymmetrical thioethers containing a tertiary carbon to sulfur linkage can be produced from any tertiary base olefin and a mercaptan regardless of the position of the double bond and the presence of peroxides in the starting hydrocarbon. For example, if a primary mercaptan is used, thioethers, having a secondary or tertiary carbon to sulfur linkage, depending on the olefin, can be produced as illustrated by the following equations:

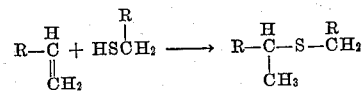

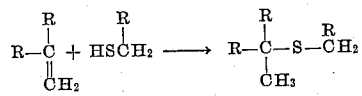

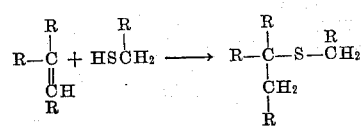

where R is any hydrocarbon radical.

Using hydrogen sulfide and an unsaturated compound, the reaction conducted according to the invention can be carried out to yield a product predominating in thioethers. For example, symmetrical di-secondary or di-tertiary thioethers may be produced from olefins and hydrogen sulfide according to the following equations:

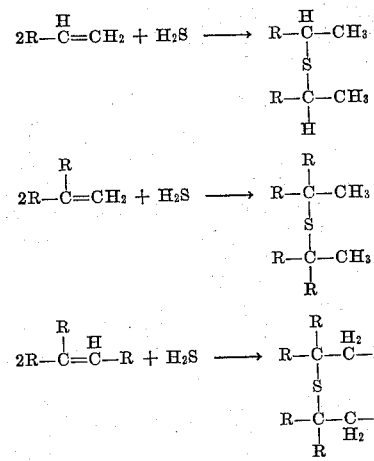

Although not generally desirable, the reaction may be carried out to produce a mixture of mercaptans and thioethers.

The production of symmetrical thioethers from hydrogen sulfide and unsaturated hydrocarbons may be accomplished by any one of several variations of the process. In a batch operation carried out by maintaining a given pressure of hydrogen sulfide in the system, a product predominating in thioether may be obtained by increasing the contact time and temperature over that required for optimum mercaptan formation. Or, preferably, a more complete conversion of, for example, an olefin to symmetrical secondary or tertiary thioethers, depending on the olefin, may be effected by discontinuing the supply of hydrogen sulfide when about one-half of the olefin has been converted to mercaptan, but continuing agitation and maintaining or slightly increasing the temperature. If more than 50 per cent of the olefin is allowed to react to form mercaptan, additional olefin may be pumped into the reaction chamber in sufficient amount to react with all the mercaptan present to form thioether.

In a more efficient modification of batch operation, where a plurality of charges are processed for a given initial charge of catalyst, the variations described in the preceding paragraph are applicable to each unit charge.

In continuous operation, where catalyst or catalyst-complex is continuously charged in accordance with the withdrawal of spent catalyst phase, the unsaturated hydrocarbon and hydrogen sulfide are continuously charged, and products pass continuously through a settler and then through treating and washing units, it is advantageous to operate with approximately a two to one ratio of unsaturated compound to hydrogen sulfide to yield a product which is predominantly thioether, but a one to one ratio may be used. For greater purity of product, two reactors in series may be used, the second following the settler of the first, after which the product from the second flows to a second settler and thence to hydrolysis and washing towers and fractionating units. With this operation, olefin is converted to mercaptan wholly or in part in the first reactor and further reaction to form thioether is carried out in the second reactor by charging sufficient olefin to be in one to one ratio with the mercaptan present. Catalyst or catalyst complex from the first reactor may be circulated to the second reactor, or a separate catalyst cycle and circulation may be used in the second reactor.

With either variation of the process, the catalyst phase may be additionally activated or have its activity prolonged by the addition of small amounts of powdered metal and hydrogen halide corresponding to the metal and halide of the catalyst used, or by the addition of small amounts of fresh catalyst. This procedure is particularly advantageous in the two-step variations of the process for producing thioethers from hydrogen sulfide and unsaturated compounds, where the addition is made between the steps of mercaptan formation and thioether formation.

Isobutylene and its polymers, such as diisobutylene and triisobutylene, are of special value in the production of tertiary mercaptans and tertiary alkyl sulfides. The use of these olefins, for example diisobutylene, serves to illustrate another pronounced advantage inherent in the present invention as compared to previous methods. Diisobutylene as normally produced and encountered is a mixture of 4 parts of 2,4,4-trimethyl-pentene-1 and 1 part of 2,4,4-trimethyl-pentene-2. With known processes, upon reaction of common diisobutylene with hydrogen sulfide in the presence of peroxides, a mixture of primary mercaptan, 2,4,4-trimethyl-pentanethiol-1, and secondary mercaptan 2,4,4-trimethyl-pentanethiol-3, in an approximate ratio of 4 to 1 would be produced as the mercaptan product. For the production of a single thioether from such a mixture, these two mercaptans preferably would have to be separated and the more desirable secondary mercaptan would be in minor amount. Using either the separated primary or secondary mercaptan, the addition to diisobutylene to form the thioether would again result in a mixed product, substantially two thioethers, which again would have to be separated and no thioether having an alkyl radical tertiary with respect to the sulfur atom would result.

In contrast, when the reaction is carried out according to this invention, the mercaptan product from diisobutylene and hydrogen sulfide is not only entirely tertiary mercaptan, but is a single tertiary mercaptan, 2,4,4-trimethyl-pentanethiol-2. Similarly, when this tertiary mercaptan is reacted with diisobutylene, it gives a single thioether, bis 2-(2,4,4-trimethyl-pentyl)

sulfide, with two tertiary octyl radicals attached to the sulfur atom. In short, according to the prior art the reaction of diisobutylene and hydrogen sulfide to form mercaptans in the presence of peroxides would result in a mixed product of primary and secondary mercaptans, with the secondary in minor amount. Similarly, the reaction of diisobutylene and hydrogen sulfide to form thioethers in the presence of peroxides would result in a mixed product containing three thioethers, a di-primary and a primary-secondary in major amounts and a di-secondary in minor amount, with no significant quantity of a thioether containing a tertiary carbon to sulfur linkage. By means of the present invention, however, the reaction of diisobutylene and hydrogen sulfide when carried out in the presence of peroxides to form mercaptan results in the single, tertiary mercaptan, 2,4,4-trimethyl-pentanethiol-2. Further, when the reaction is carried out to form thioether, using only diisobutylene and hydrogen sulfide as raw materials, substantially only the single di-tertiary thioether, bis 2-(2,4,4-trimethylpentyl) sulfide, is produced.

The following specific examples are for the purposes of illustration and it is to be understood that the invention is not to be limited thereby.

*Example I*

A mixture of equimolar quantities of diisobutylene, which had been exposed to air for two months and contained peroxides, and ethyl mercaptan was processed in three equal successive charges in a stainless steel contactor using an initial charge of 0.30 mole of anhydrous aluminum chloride as catalyst. The total amount of diisobutylene and ethyl mercaptan processed was 8.14 moles, 4.07 moles of each. The contact time during which the mixture was agitated was 0.25 hour per unit charge, the average temperature was 22° C., and the pressure was atmospheric. The yield of tertiary octyl ethyl sulfide was 83 per cent of the theoretical. The addition of the ethyl mercaptan to the diisobutylene was in accordance with the following equations:

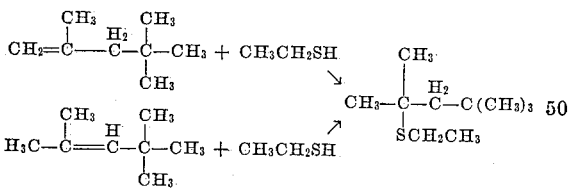

It is to be noted that the addition of the mercaptan occurred in accordance with Markownikoff's rule, thus showing that the orienting influence of the peroxides had been obviated. Thus a single thioether product was advantageously obtained from the two olefins constituting commercial diisobutylene.

*Example II*

Eight and one-fourth moles of peroxide-containing diisobutylene was reacted, in six equal successive charges for an initial charge of 0.30 mole of anhydrous aluminum chloride with hydrogen sulfide at a pressure of 40 pounds per square inch, gauge, average temperature of −18° C., and contact time of 0.25 hour per unit charge. After treating, washing and fractional distillation, the yield of 2,4,4-trimethylpentanethiol-2 (B. P. 155°–156° C. converted to 760 mm.) recovered was 85 per cent of the theoretical. The addition of the hydrogen sulfide to the two octene isomers constituting the diisobutylene is given by the following equations:

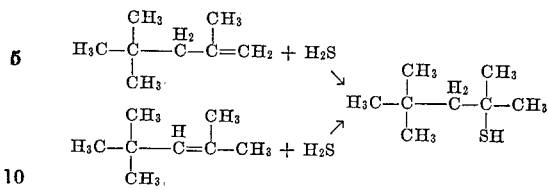

It is to be noted that the process when carried out according to this invention not only produced tertiary mercaptan, but produced a single tertiary mercaptan identified as above.

*Example III*

In a stainless steel contactor, 19.07 moles of peroxide-containing triisobutylene (B. P. 173°–178° C.), fractionated from isobutylene polymers and weathered, was reacted with hydrogen sulfide in six equal successive charges for 0.30 mole initial charge of anhydrous aluminum chloride as catalyst. A pressure of 60 pounds per square inch, gauge, was maintained; the average temperature was −23° C.; and the contact time per unit charge was 0.25 hour. The yield of tertiary dodecyl mercaptan (B. P. 227°–228° C. converted to 760 mm.) was approximately 50 per cent of the theoretical.

*Example IV*

Diisobutylene, originally fractionated from isobutylene polymers, with a peroxide number of 9 as a result of peroxide formation in situ on standing was treated to remove all peroxides. Sufficient benzoyl peroxide was dissolved in the peroxide-free dimer to give a peroxide number of 14.4. This diisobutylene (3.05 moles), containing benzoyl peroxide was reacted as a single charge with hydrogen sulfide in the presence of 0.15 mole of anhydrous aluminum chloride as catalyst at a pressure of 20 pounds per square inch, gauge, average temperature of 33° C., and a contact time of 0.20 hour. The yield of 2,4,4-trimethylpentanethiol-2 was about 70 percent of the theoretical. Thus again the addition took place substantially in accordance with Markownikoff's rule, thereby producing a single, tertiary mercaptan from the predominant constituents of diisobutylene, in spite of the presence of a relatively large amount of a pure and comparatively stable peroxide.

In the many experimental tests of the process, the products obtained were carefully identified as secondary or tertiary mercaptans by determination of constants and by the chemical test described by H. Rheinboldt at Ber. 60, 184 (1927), which test differentiates between mercaptans by means of a color reaction with nitrous acid. Under the conditions of the test, tertiary mercaptans give a green color; primary and secondary mercaptans give a red color.

The mercaptans and thioethers produced according to this invention have distinctive and extensive utility for a wide variety of purposes. Tertiary and secondary aliphatic mercaptans of high molecular weight in small amount in lubricating oil are effective anti-oxidation and anti-corrosion agents whereas primary mercaptans are comparatively ineffective. In many instances tertiary mercaptans of high molecular weight ($C_8$–$C_{16}$) are preferable to primary and secondary mercaptans of corresponding molecular weight as modifiers in the emulsion polymerization process for synthetic rubber. Tertiary and secondary thioethers are particularly desirable for the manufacture of detergent sulfonium compounds. Tertiary and secondary mercaptans and thioethers are specifically useful as intermediates in the synthesis of corresponding organic compounds, especially organic sulfur compounds. Some of these mercaptans and thioethers are useful as solvents for a variety of polymerization or condensation products such as elastomers, resins, etc. Some are also useful as constituents of insecticides and insect-repellents.

Since many different embodiments of the process comprising this invention may be made by varying reactants and conditions within the ranges outlined without departing from the spirit or scope of the invention, it is to be understood that the invention is not to be limited to the specific embodiments thereof given as examples except as defined in the appended claims.

What is claimed is:

1. The method of preparing secondary and tertiary mercaptans from olefins containing a terminal double bond and which olefins are admixed with peroxides in amount sufficient to cause abnormal addition of the sulfhydryl group to the olefin comprising reacting said olefins with hydrogen sulfide under anhydrous conditions in the presence of a Friedel-Crafts catalyst.

2. The method of preparing a single thiol compound from a mixture of two isomeric olefins differing in structure only in that one olefin has a terminal double bond which is in a position immediately adjacent to the position of the double bond in the other, which mixture contains organic peroxides in amount sufficient to cause abnormal addition of the sulfhydryl group to the olefins, comprising reacting said mixture with hydrogen sulfide under anhydrous conditions in the presence of a sufficient Friedel-Crafts catalyst to promote normal addition of the sulfhydryl group to the olefins.

3. Method in accordance with claim 2 in which the two isomeric olefins are 2,4,4-trimethyl-pentene-1 and 2,4,4-trimethyl-pentene-2.

4. The method of preparing a single thioether from a mixture of two isomeric olefins differing from each other in structure only in that the double bond in one is a terminal bond and is in a position immediately adjacent to the position of the double bond in the other, which mixture contains sufficient organic peroxides to promote abnormal addition of the sulfhydryl group, comprising reacting the mixture with a mercaptan under anhydrous conditions in the presence of a Friedel-Crafts catalyst in amount to cause normal addition of the sulfhydryl group to the olefins.

5. Method in accordance with claim 4 in which the two isomeric olefins are 2,4,4-trimethyl-pentene-1 and 2,4,4-trimethyl-pentene-2.

6. The method of preparing mercaptans and thioethers, which are free of isomeric compounds thereof, from a mixture of two isomeric olefinic hydrocarbons differing from each other only in that the olefin linkage of one is a terminal bond and in a position immediately adjacent to the position of the olefinic linkage in the other, and which mixture contains sufficient organic peroxides to promote abnormal addition of the sulfhydryl group, comprising reacting said mixture with a compound selected from the group consisting of hydrogen sulfide and mercaptans at about $-35°$ to $125°$ C. in the presence of sufficient Friedel-Crafts catalyst to promote the normal addition of the sulfhydryl group.

RICHMOND T. BELL.

REFERENCES CITED

The following references are of record in the file of this patent:

UNITED STATES PATENTS

| Number | Name | Date |
|---|---|---|
| 2,352,435 | Hoeffelman | June 27, 1944 |
| 2,366,453 | Meadow | Jan. 2, 1945 |
| 2,412,814 | Kendall | Dec. 17, 1946 |
| 2,434,510 | Olin et al. | Jan. 13, 1948 |
| 2,447,481 | Bell et al. | Aug. 24, 1948 |

OTHER REFERENCES

Jones et al.: Jour. Am. Chem. Soc., vol. 60, pages 2452–2455 (1938).

Dunstan et al.: "The Science of Petroleum," vol. IV, page 3040, Oxford University Press, N. Y. (1938).

Mayo et al.: Chem. Reviews, vol. 27, page 388 (1940).